United States Patent
Schlegel

(10) Patent No.: US 7,268,758 B2
(45) Date of Patent: Sep. 11, 2007

(54) TRANSISTOR BACKPLANES FOR LIQUID CRYSTAL DISPLAYS COMPRISING DIFFERENT SIZED SUBPIXELS

(75) Inventor: Matthew Osbourne Schlegel, Palo Alto, CA (US)

(73) Assignee: Clairvoyante, Inc, Sebastopol, CA (US)

( * ) Notice: Subject to any disclaimer, the term of this patent is extended or adjusted under 35 U.S.C. 154(b) by 626 days.

(21) Appl. No.: 10/807,604

(22) Filed: Mar. 23, 2004

(65) Prior Publication Data

US 2005/0212741 A1    Sep. 29, 2005

(51) Int. Cl.
*G09G 3/36* (2006.01)
(52) U.S. Cl. ................ 345/88; 345/92; 345/695
(58) Field of Classification Search ......... 345/72, 345/83, 88–103, 690, 695; 315/169.3; 349/42, 349/142, 143
See application file for complete search history.

(56) References Cited

U.S. PATENT DOCUMENTS

| | | | |
|---|---|---|---|
| 5,126,865 A * | 6/1992 | Sarma | 349/85 |
| 5,162,931 A * | 11/1992 | Holmberg | 349/54 |
| 5,184,114 A | 2/1993 | Brown | |
| 5,191,451 A | 3/1993 | Katayama et al. | |
| 5,341,153 A | 8/1994 | Benzschawel et al. | |
| 5,398,066 A | 3/1995 | Martinez-Uriegas et al. | |
| 5,459,595 A | 10/1995 | Ishiguro | |
| 5,646,702 A * | 7/1997 | Akinwande et al. | 349/69 |
| 5,729,244 A | 3/1998 | Lockwood | |
| 5,754,226 A | 5/1998 | Yamada et al. | |
| 6,005,692 A | 12/1999 | Stahl | |
| 6,008,868 A | 12/1999 | Silverbrook | |
| 6,037,719 A | 3/2000 | Yap et al. | |
| 6,144,352 A | 11/2000 | Matsuda et al. | |
| 6,147,664 A | 11/2000 | Hansen | |
| 6,151,001 A | 11/2000 | Anderson et al. | |
| 6,188,385 B1 | 2/2001 | Hill et al. | |
| 6,262,710 B1 | 7/2001 | Smith | |
| 6,278,434 B1 | 8/2001 | Hill et al. | |
| 6,360,023 B1 | 3/2002 | Betrisey et al. | |
| 6,393,145 B2 | 5/2002 | Betrisey et al. | |
| 6,486,923 B1 | 11/2002 | Maeshima et al. | |
| 6,614,414 B2 | 9/2003 | De Haan et al. | |
| 6,628,068 B1 | 9/2003 | Rorison et al. | |
| 6,738,526 B1 | 5/2004 | Betrisey et al. | |
| 6,756,953 B1 * | 6/2004 | Tokioka et al. | 345/87 |
| 6,937,217 B2 | 8/2005 | Klompenhouwer et al. | |
| 6,940,222 B2 * | 9/2005 | Sakurai | 313/500 |
| 6,950,115 B2 | 9/2005 | Brown Elliott | |

(Continued)

FOREIGN PATENT DOCUMENTS

WO    WO 00/42762    7/2000

OTHER PUBLICATIONS

Betrisey, C., et al., Displaced Filtering for Patterned Displays, SID Symp. Digest 1999, pp. 296-299.

(Continued)

*Primary Examiner*—Lun-Yi Lao

(57) ABSTRACT

A display and a method for manufacturing said display is disclosed wherein said display is comprised of at least a first set of subpixels and a second set of subpixels—said first set of subpixels comprising smaller area than said second subpixels. The thin film transistors that drive said first set of subpixels are formed substantially in the area of said second set of subpixels.

7 Claims, 3 Drawing Sheets

U.S. PATENT DOCUMENTS

| | | |
|---|---|---|
| 2001/0048764 A1 | 12/2001 | Betrisey et al. |
| 2002/0158997 A1 | 10/2002 | Fukami et al. |
| 2003/0071943 A1* | 4/2003 | Choo et al. .................. 349/106 |
| 2003/0218618 A1 | 11/2003 | Phan |
| 2004/0046714 A1 | 3/2004 | Brown Elliott |
| 2004/0239813 A1 | 12/2004 | Klompenhouwer |
| 2004/0246393 A1 | 12/2004 | Elliott et al. |

OTHER PUBLICATIONS

Brown Elliott, C., "Active Matrix Display . . . ", IDMC 2000, 185-189, Aug. 2000.

Brown Elliott, C., "Color Subpixel Rendering Projectors and Flat Panel Displays," SMPTE, Feb. 27-Mar. 1, 2003, Seattle, WA pp. 1-4.

Brown Elliott, C, "Co-Optimization of Color AMLCD Subpixel Architecture and Rendering Algorithms," SID 2002 Proceedings Paper, May 30, 2002 pp. 172-175.

Brown Elliott, C, "Development of the PenTile Matrix™ Color AMLCD Subpixel Architecture and Rendering Algorithms", SID 2003, Journal Article.

Brown Elliott, C, "New Pixel Layout for PenTile Matrix™ Architecture", IDMC 2002, pp. 115-117.

Brown Elliott, C, "Reducing Pixel Count Without Reducing Image Quality", Information Display Dec. 1999, vol. 1, pp. 22-25.

Credelle, Thomas, "P-00: MTF of High-Resolution PenTile Matrix Displays", Eurodisplay 02 Digest, 2002 pp. 1-4.

Klompenhouwer, Michiel, Subpixel Image Scaling for Color Matrix Displays, SID Symp. Digest. May 2002, pp. 176-179.

Michiel A. Klompenhouwer, Gerard de Haan, Subpixel image scaling for color matrix displays, Journal of the Society for Information Display, vol. 11, Issue 1, Mar. 2003, pp. 99-108.

Messing, Dean et al., Improved Display Resolution of Subsampled Colour Images Using Subpixel Addressing, IEEE ICIP 2002, vol. 1, pp. 625-628.

Messing, Dean et al., Subpixel Rendering on Non-Striped Colour Matrix Displays, 2003 International Conf on Image Processing, Sep. 2003, Barcelona, Spain, 4 pages.

* cited by examiner

TRANSISTOR BACKPLANES FOR LIQUID CRYSTAL DISPLAYS COMPRISING DIFFERENT SIZED SUBPIXELS

BACKGROUND

In commonly owned United States patent applications: (1) U.S. patent application Ser. No. 09/916,232 ("the '232 application"), entitled "ARRANGEMENT OF COLOR PIXELS FOR FULL COLOR IMAGING DEVICES WITH SIMPLIFIED ADDRESSING," filed Jul. 25, 2001, now issued as U.S. Pat No. 6,903,754; (2) U.S. patent application Ser. No. 10/278,353 ("the '353 application"), entitled "IMPROVEMENTS TO COLOR FLAT PANEL DISPLAY SUB-PIXEL ARRANGEMENTS AND LAYOUTS FOR SUB-PIXEL RENDERING WITH INCREASED MODULATION TRANSFER FUNCTION RESPONSE," filed Oct. 22, 2002, and published as U.S. patent application Publication No. 2003/0128225; (3) U.S. patent application Ser. No. 10/278,352 ("the '352 application"), entitled "IMPROVEMENTS TO COLOR FLAT PANEL DISPLAY SUB-PIXEL ARRANGEMENTS AND LAYOUTS FOR SUB-PIXEL RENDERING WITH SPLIT BLUE SUB-PIXELS," filed Oct. 22, 2002, and published as U.S. patent application Publication No. 2003/0128179; (4) U.S. patent application Ser. No. 10/243,094 ("the '094 application), entitled "IMPROVED FOUR COLOR ARRANGEMENTS AND EMITTERS FOR SUB-PIXEL RENDERING," filed Sep. 13, 2002, and published as U.S. patent application Publication No. 2004/0051724; (5) U.S. patent application Ser. No. 10/278,328 ("the '328 application"), entitled "IMPROVEMENTS TO COLOR FLAT PANEL DISPLAY SUB-PIXEL ARRANGEMENTS AND LAYOUTS WITH REDUCED BLUE LUMINANCE WELL VISIBILITY," filed Oct. 22, 2002, and published as U.S. patent application Publication No. 2003/0117423; (6) U.S. patent application Ser. No. 10/278,393 ("the '393 application"), entitled "COLOR DISPLAY HAVING HORIZONTAL SUB-PIXEL ARRANGEMENTS AND LAYOUTS," filed Oct. 22, 2002, and published as U.S. patent application Publication No. 2003/0090581; and (7) U.S. patent application Ser. No. 01/347,001 ("the '001 application") entitled "IMPROVED SUB-PIXEL ARRANGEMENTS FOR STRIPED DISPLAYS AND METHODS AND SYSTEMS FOR SUB-PIXEL RENDERING SAME," filed Jan. 16, 2003, and published as U.S. patent application Publication No. 2004/0080479, each of which is herein incorporated by reference in its entirety, novel sub-pixel arrangements are disclosed for improving the cost/performance curves for image display devices.

For certain subpixel repeating groups having an even number of subpixels in a horizontal direction, the following systems and techniques to affect proper dot inversion schemes are disclosed and these applications are herein incorporated by reference in their entirety: (1) U.S. patent application Ser. No. 10/456,839 entitled "IMAGE DEGRADATION CORRECTION IN NOVEL LIQUID CRYSTAL DISPLAYS", and published as U.S. patent application Publication No. 2004/0246280; (2) U.S. patent application Ser. No. 10/455,925 entitled "DISPLAY PANEL HAVING CROSSOVER CONNECTIONS EFFECTING DOT INVERSION", and published as U.S. patent application Publication No. 2004/0246213; (3) U.S. patent application Ser. No. 10/455,931 entitled "SYSTEM AND METHOD OF PERFORMING DOT INVERSION WITH STANDARD DRIVERS AND BACKPLANE ON NOVEL DISPLAY PANEL LAYOUTS", and issued as U.S. Pat. No. 7,218,301; (4) U.S. patent application Ser. No. 10/455,927 entitled "SYSTEM AND METHOD FOR COMPENSATING FOR VISUAL EFFECTS UPON PANELS HAVING FIXED PATTERN NOISE WITH REDUCED QUANTIZATION ERROR", and issued as U.S. Pat. No. 7,209,105; (5) U.S. patent application Ser. No. 10/456,806 entitled "DOT INVERSION ON NOVEL DISPLAY PANEL LAYOUTS WITH EXTRA DRIVERS", and issued as U.S. Pat. No. 7,187,353; (6) U.S. patent application Ser. No. 10/456,838 entitled "LIQUID CRYSTAL DISPLAY BACKPLANE LAYOUTS AND ADDRESSING FOR NON-STANDARD SUBPIXEL ARRANGEMENTS", and published as U.S. patent application Publication No. 2004/0246404; and (7) U.S. patent application Ser. No. 10/696,236 entitled "IMAGE DEGRADATION CORRECTION IN NOVEL LIQUID CRYSTAL DISPLAYS WITH SPLIT BLUE SUB-PIXELS", filed Oct. 28, 2003, and published as U.S. patent application Publication No. 2005/0083277.

These improvements are particularly pronounced when coupled with sub-pixel rendering (SPR) systems and methods further disclosed in those applications and in commonly owned United States patent applications and patents: (1) U.S. patent application Ser. No. 10/051,612 ("the '612 application"), entitled "CONVERSION OF A SUB PIXEL FORMAT DATA TO ANOTHER MATRIX SUB-PIXEL DATA FORMAT," filed Jan. 16, 2002, and now issued as U.S. Pat. No. 7,123,277; (2) U.S. patent application Ser. No. 10/150,355 ("the '355 application"), entitled "METHODS AND SYSTEMS FOR SUB-PIXEL RENDERING WITH GAMMA ADJUSTMENT," filed May 17, 2002, and now issued as U.S. Pat. No. 7,221,381; (3) U.S. patent application Ser. No. 10/215,843 ("the '843 application"), entitled "METHODS AND SYSTEMS FOR SUB-PIXEL RENDERING WITH ADAPTIVE FILTERING," filed Aug. 8, 2002, and now issued as U.S. Pat. No. 7,184,066; (4) U.S. patent application Ser. No. 10/379,767 entitled "SYSTEMS AND METHODS FOR TEMPORAL SUB-PIXEL RENDERING OF IMAGE DATA" filed Mar. 4, 2003, and published as U.S. patent application Publication No. 2004/0196302; (5) U.S. patent application Ser. No. 10/379,765 entitled "SYSTEMS AND METHODS FOR MOTION ADAPTIVE FILTERING," filed Mar. 4, 2003, and now issued as U.S. Pat. No. 7,167,186; (6) U.S. patent application Ser. No. 10/379,766 entitled "SUB-PIXEL RENDERING SYSTEM AND METHOD FOR IMPROVED DISPLAY VIEWING ANGLES" filed Mar. 4, 2003, and now issued as U.S. Pat. No. 6,917,368; and (7) U.S. patent application Ser. No. 10/409,413 entitled "IMAGE DATA SET WITH EMBEDDED PRE-SUBPIXEL RENDERED IMAGE" filed Apr. 7, 2003, and published as U.S. patent application Publication No. 2004/0196297, which are hereby incorporated herein by reference in their entirety.

Improvements in gamut conversion and mapping are disclosed in commonly owned and co-pending United States patent applications: (1) U.S. patent application Ser. No. 10/691,200 entitled "HUE ANGLE CALCULATION SYSTEM AND METHODS", filed Oct. 21, 2003, and now issued as U.S. Pat. No. 6,980,219; (2) U.S. patent application Ser. No. 10/691,377 entitled "METHOD AND APPARATUS FOR CONVERTING FROM SOURCE COLOR SPACE TO RGBW TARGET COLOR SPACE", filed Oct. 21, 2003, and published as U.S. patent application Publication No. 2005/0083341; (3) U.S. patent application Ser. No. 10/691,396 entitled "METHOD AND APPARATUS FOR CONVERTING FROM A SOURCE COLOR SPACE TO A TARGET COLOR SPACE", filed Oct. 21, 2003, and published as U.S. patent application Publication No. 2005/0083352; and (4) U.S. patent application Ser. No. 10/690, 716 entitled "GAMUT CONVERSION SYSTEM AND METHODS", and now issued as U.S. Pat. No. 7,176,935, which are all hereby incorporated herein by reference in their entirety.

Additional advantages have been described in (1) U.S. patent application Ser. No. 10/696,235 entitled "DISPLAY SYSTEM HAVING IMPROVED MULTIPLE MODES FOR DISPLAYING IMAGE DATA FROM MULTIPLE INPUT SOURCE FORMATS", filed Oct. 28, 2003, and now issued as U.S. Pat. No. 7,084,923; and (2) U.S. patent application Ser. No. 10/696,026 entitled "SYSTEM AND METHOD FOR PERFORMING IMAGE RECONSTRUCTION AND SUBPIXEL RENDERING TO EFFECT SCALING FOR MULTI-MODE DISPLAY" filed Oct. 28, 2003, and published as U.S. patent application Publication No. 2005/0088385; which are all hereby incorporated by reference. All patent applications mentioned in this specification are hereby incorporated by reference in their entirety.

BRIEF DESCRIPTION OF THE DRAWINGS

The accompanying drawings, which are incorporated in, and constitute a part of this specification illustrate exemplary implementations and embodiments of the invention and, together with the description, serve to explain principles of the invention.

DETAILED DESCRIPTION

Reference will now be made in detail to implementations and embodiments, examples of which are illustrated in the accompanying drawings. Wherever possible, the same reference numbers will be used throughout the drawings to refer to the same or like parts.

Figure 1:
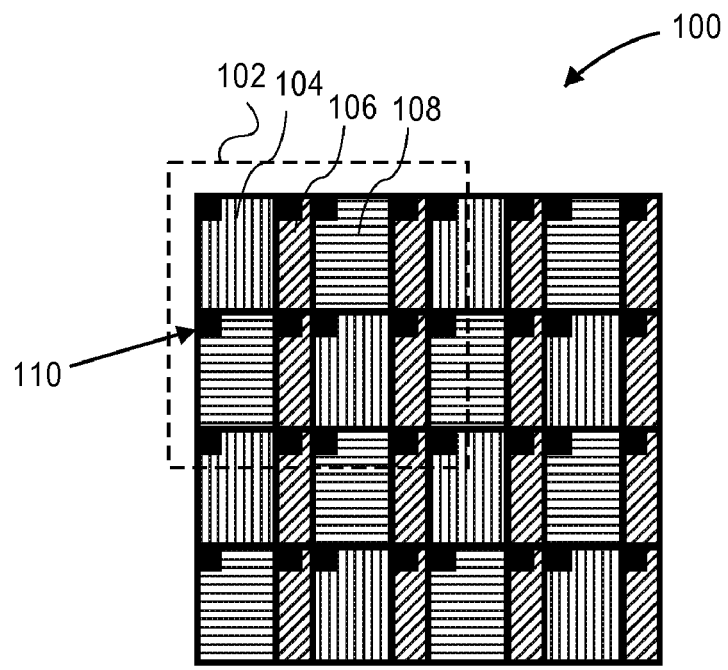
FIG. 1 is an example of a display comprising a subpixel repeating unit wherein there are at least two subpixels comprising different sizes and/or dimensions and an associated TFT backplane.

In commonly-owned applications listed above, there are shown display panels comprising a subpixel repeating group that further comprises subpixels of different physical dimensions. One example is shown in FIG. 1. A portion of display panel 100 is depicted here as comprising an octal repeating subpixel grouping 102 that comprises a checkerboard of red subpixels 104 and blue subpixels 108. These red and blue subpixels are larger in width that the four interspersed green subpixels 104. Each subpixel is shown as being driven by a thin film transistor (TFT) 110 in one of the corners of the subpixel.

It may not be desirable to locate these TFTs in the corner of the smaller subpixels for several reasons. First, as the smaller subpixels are impacted in their aperture ratio more greatly than the larger subpixels, it might be desirable to locate their TFTs elsewhere. Second, at sufficiently high dots per inch (DPI), defects in the manufacture of TFTs for smaller sized subpixels might adversely impact the overall yield of panels having different sized subpixels. This may be especially true for amorphous silicon (a-Si) displays having pixel densities at or above approximately 150 dpi. This may be adversely impact aperture ratio because of the relatively large TFT used in a-Si.

Additionally, there may be some defects that arise in mask misalignments that result in the smaller (in this example, green) subpixels being more impacted over most of the panel than the larger (e.g, red and blue) subpixels. Such misalignments may create a color shift overall and could be corrected by tuning the backlight for such defective panels or by designing the manufacturing process to create up to a certain level of mask misalignment. However, moving the TFTs into the larger subpixels might alleviate to some degree the overall color shifting that might occur with mask misalignments.

It should be appreciated that the principles of the present invention are applicable to any subpixel layout having subpixels of different size. In fact, the number of subpixels in the repeating group and their color assignments may be any desired and chosen. It suffices that there are merely at least two subpixels that have different sizes/dimensional for the purpose of the present invention. Additionally, it might be desirable to locate all smaller subpixel TFTs into larger subpixel areas; or it may be desirable to locate a subset of such smaller subpixel TFTs into larger subpixel areas. It suffices that some of such smaller subpixel TFT are formed and located into larger subpixel areas. Thus, the scope of the present invention should not be limited to the particular examples of such layouts disclosed in the drawings and the specification.

Figure 2:
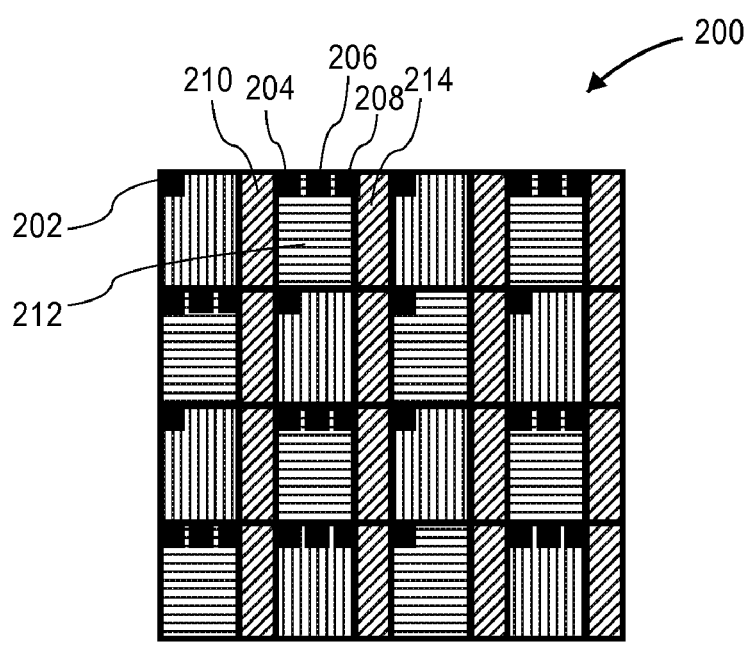
FIG. 2 is one example of a display comprising at least two subpixels having different sizes/dimensions with a TFT backplane as made in accordance with the principles of the present invention.

FIG. 2 depicts one embodiment of an improved TFT layout for displays comprising subpixels of different sizes. In this embodiment, the transistors in the smaller sized subpixels are moved to reside in the area of the larger subpixels. For example, in FIG. 2, it is seen that TFT 202 drives a red subpixel and blue subpixel 212 comprises TFTs 204, 206 and 208—which might drive subpixels 210, 212 and 214. In this embodiment, the aperture ratio of the blue subpixels would be impacted more than either the smaller, green subpixels or the larger red subpixel. This arrangement might be desirable, as the color blue has less emphasis in the human visual system.

Of course, it would be appreciated that other embodiments would also be suitable. For example, the red subpixels could contain all or one extra TFTs to help drive the smaller subpixels. Additionally, the plurality of TFTs placed inside the larger subpixel may be placed in different locations (e.g. lower side or different corners) of the subpixel.

Additionally, other color assignments for the larger and the smaller subpixels could be arranged. As stated above, it merely suffices that there are at least two different sized subpixels of any color and that some or all of the TFTs that would drive the smaller subpixels are constructed in the areas of the larger subpixels.

Figure 3:
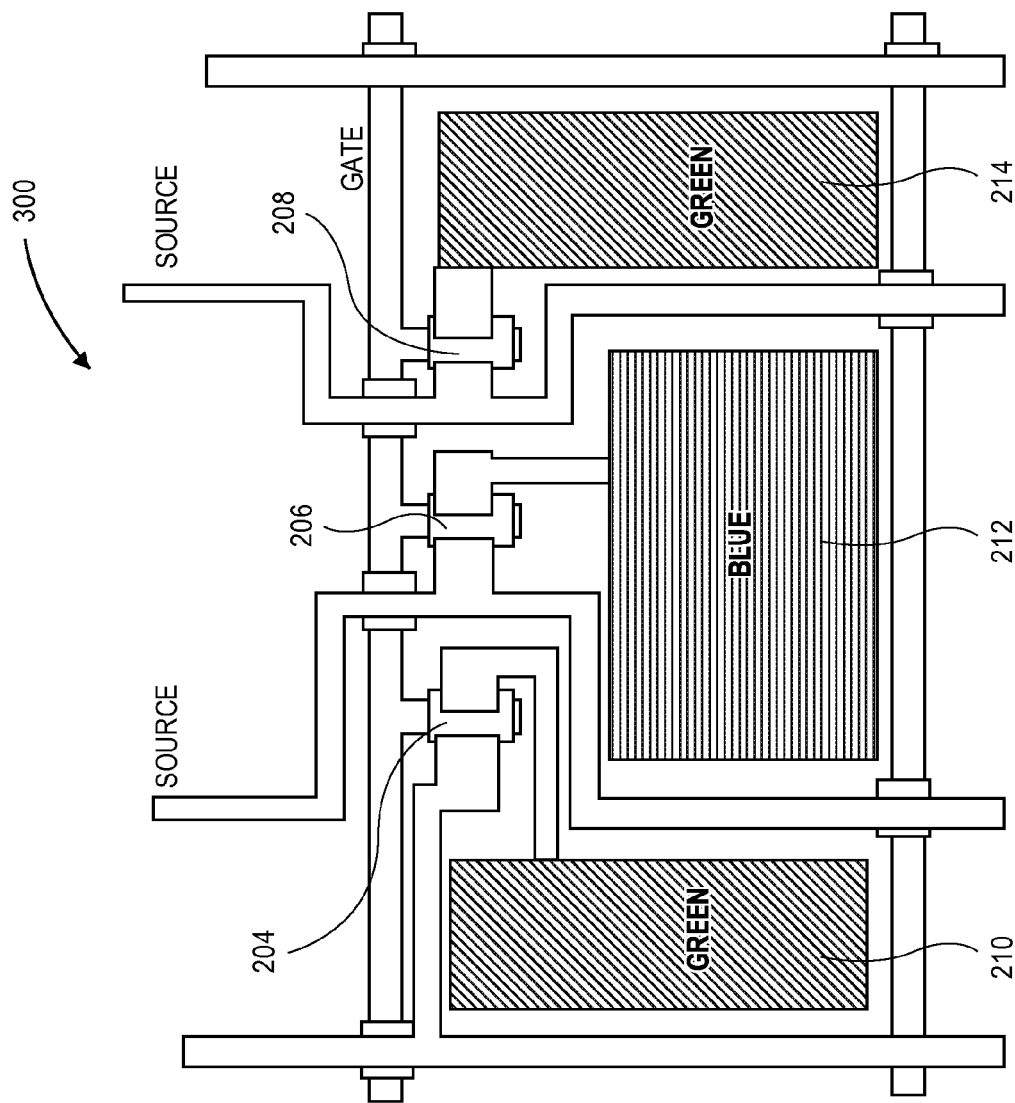
FIG. 3 is one example of an implementation of a TFT backplane as made in accordance with the principles of the present invention.
Figure 4:
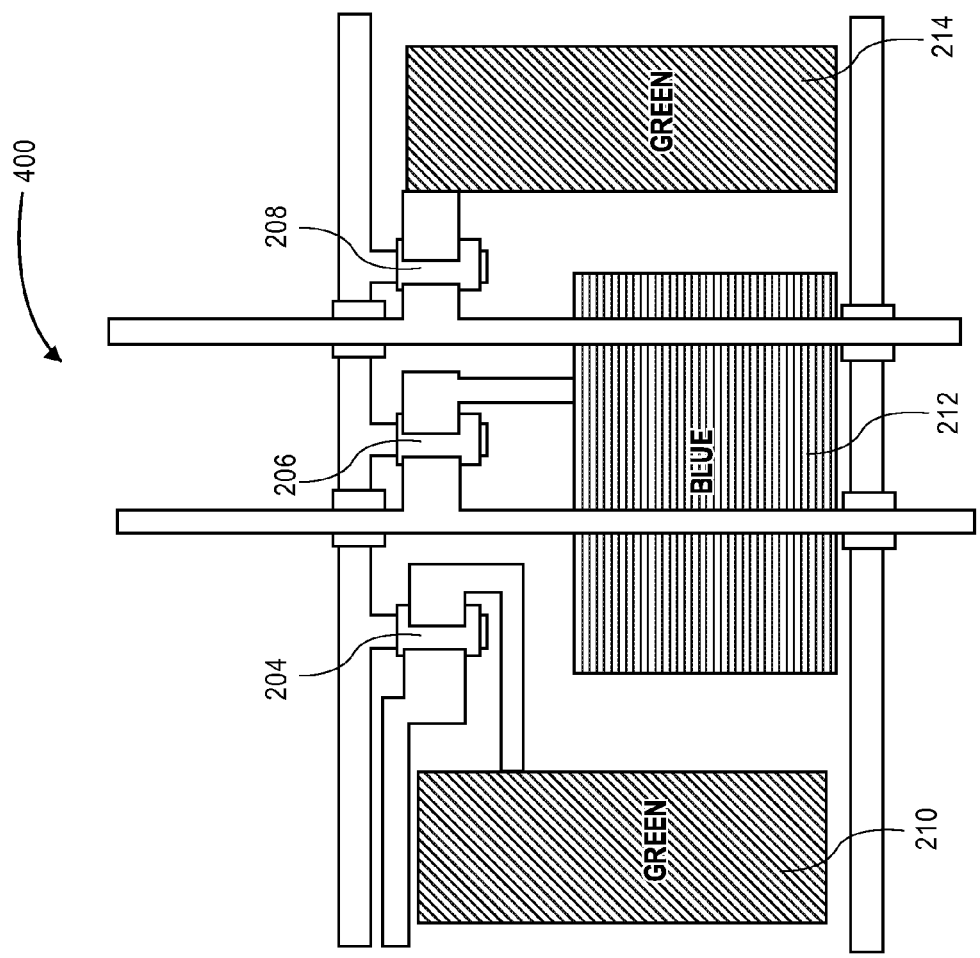
FIG. 4 is another example of an implementation of a TFT backplane as made in accordance with the principles of the present invention.

FIGS. 3 and 4 show two possible embodiments for implementations of TFTs that drive proximate smaller subpixels within a larger subpixel—such as for subpixel 212 in FIG. 2. As may be seen, subpixels 210 and 214 are driven by TFTs 204 and 208 that are located with the space allocated to subpixel 212 in both FIGS. 3 and 4. It should be appreciated that neither FIG. 3 or 4 are drawn to scale here. Additionally, it should be appreciated that there are many other possible TFT designs that would suffice for the purposes of the present invention.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A display comprising:
    a plurality of first subpixels;
    a plurality of second subpixels, wherein said first subpixels have a smaller size than said second subpixels; and
    a plurality of transistors driving said first and said second subpixels wherein said transistors for said first subpixels are formed in the area of said second subpixels.

2. The display of claim 1 wherein said plurality of first subpixels comprise a first color filter and said plurality of second subpixels comprise a second color filter and a third color filter.

3. The display of claim 2 wherein said second color filter is blue and said plurality of transistors driving said plurality of said first subpixels are formed in said blue color filtered subpixels.

4. A method for manufacturing in a LCD display wherein said LCD display comprises at least a first set of subpixels and a second set of subpixels wherein said first set of subpixels comprise a smaller area than said second set of subpixels and further wherein said first and said second subpixels are driven by a set of thin film transistors; the steps of said method comprising:
    forming a thin film transistor backplane such that a plurality of thin film transistors driving a subset of said first set of subpixels are formed substantially in the area of said second set of subpixels.

5. The method of claim 4 wherein said first set of subpixels comprises green subpixels.

6. The method of claim 4 wherein said first set of subpixels comprises blue subpixels.

7. The method of claim 4 wherein said thin film transistors are formed in a subset of said second set of subpixels, said subset of said second set of subpixels comprising substantially blue subpixels.

* * * * *